United States Patent [19]
Gilchrist et al.

[11] Patent Number: 5,333,643
[45] Date of Patent: Aug. 2, 1994

[54] SOLENOID VALVE

[75] Inventors: Jon P. Gilchrist, South Bend, Ind.; William C. Klebusch, Nashua, N.H.

[73] Assignee: South Bend Controls, Inc., South Bend, Ind.

[21] Appl. No.: 36,143

[22] Filed: Mar. 24, 1993

[51] Int. Cl.[5] .............................. F16K 31/06
[52] U.S. Cl. ................. 137/605; 251/129.17; 251/331
[58] Field of Search .......... 251/129.17, 331; 137/605

[56] References Cited

U.S. PATENT DOCUMENTS 3,429,522 2/1969 Huley ..................... 251/129.17
4,836,236 6/1989 Ladisch ................... 251/331 X

FOREIGN PATENT DOCUMENTS 14678 2/1982 Japan ..................... 251/129.17

Primary Examiner—Robert G. Nilson
Attorney, Agent, or Firm—James D. Hall

[57] ABSTRACT

A solenoid valve assembly including a diaphragm assembly which is conformed to the poppet and which moves therewith. The poppet is integral with or mounted to the pole piece of the solenoid. The poppet is shaped to conform to the shape of the valve seat. The diaphragm is preferably elastomeric and stretchable to create a wiping motion against the valve seat when the solenoid is deactivated. The valve seat may also have an annular groove to allow flushing of the valve in both open and closed positions.

3 Claims, 3 Drawing Sheets

SOLENOID VALVE

BACKGROUND OF THE INVENTION

This invention relates to a solenoid actuated valve, and will have application to a solenoid valve which is easily flushed and conserves fluids passing therethrough.

Linear proportional solenoid valves are shown and described in several U.S. patents, many of which are owned by the assignee of this invention. Particular attention is drawn to U.S. Pat. No. 4,711,269 which is exemplary of this art field. In each of these patents, similarly to the solenoid employed with this invention, the solenoid coil surrounds the pole piece. Likewise, each of the aforementioned patents incorporates a central helical spring which urges the valve into a closed position.

Solenoid actuated diaphragm valves are commonly used to control and regulate the flow of fluids. The fluid can be isolated and channeled to selected chambers within the valve by means of the diaphragm. Such devices are referred to within the industry as isolation valves.

The flow path within the valve is regulated by the use of a solenoid to move the pole piece and the associated diaphragm. The diaphragm also serves as a seal to prevent fluid from entering the internal passages within the solenoid.

All diaphragm isolation valves have some internal volume within the flow path of the valve. The volume of fluid that is purged during a valving cycle is referred to as the working volume. The problem arises in that this volume of fluid may not be completely purged during a valve cycle. The volume of fluid that is not purged during the valve cycle is referred to as dead volume. Dead volume is undesirable, and it is this volume that designers of valves strive to minimize.

Typically, the sealing qualities of the diaphragm valve are a function of the diaphragm material and the poppet and seat geometry. The geometry of the poppet and the valve seat also determine the susceptibility to particulate contamination.

Present contaminant resistant bypass valves use a high force shear load approach to the elimination of problems related to particulates which inhibits the function of the valve seal and may entrap fluid or particulate matter within the valve.

Particulate contamination of a valve seat area can cause valve leakage. Accordingly, it is desirable to flush the valve seat and the diaphragm with each valve cycle, in order to remove particles from the passage and from the valve seat.

This is particularly important in the medical field, where, for example, medication is introduced into a continuing flow of fluid to the body of a patient.

SUMMARY OF THE INVENTION

This invention is directed to an improved diaphragm and poppet design in cooperation with an improved valve seat to overcome the aforementioned difficulties.

The solenoid actuated diaphragm valve of this invention utilizes the physical continuation of the poppet and the valve seat to achieve an optimum flow condition through the valve.

The configuration of this invention employs a flexible diaphragm and incorporates a geometry that effectively wipes the sealing surfaces upon each closure of the valve. This wiping action removes all particulates and contaminants from the surface of the valve seating during each operation of the valve.

The seal surface wiping action also removes all inlet fluid from the internal volume of the valve, which defines the valve as having zero dead volume. Whatever small internal flow volume remains is flushed constantly by the bypass fluid.

It is, therefore, an object of this invention to provide an improved solenoid valve which eliminates dead volume.

It is a further object of this invention to provide an improved solenoid valve which incorporates a valve seat surface which allows flushing in both open and closed positions.

It is another object of this invention to provide an improved solenoid valve which prevents entrapment of particulate matter.

It is still another object of this invention to provide an improved solenoid valve which incorporates a wiping action to clean the valve seat.

Still another object of this invention is to provide a solenoid valve assembly which is of compact design and of economic construction.

Other objects will become apparent upon a reading of the following description.

BRIEF DESCRIPTION OF THE DRAWINGS

The present invention is illustrated hereinafter by a detailed description of the preferred embodiment, which is presented in conjunction with, and by reference to, the accompanying drawings, in which like reference characters refer to like or corresponding parts, and wherein.

Figure 1:
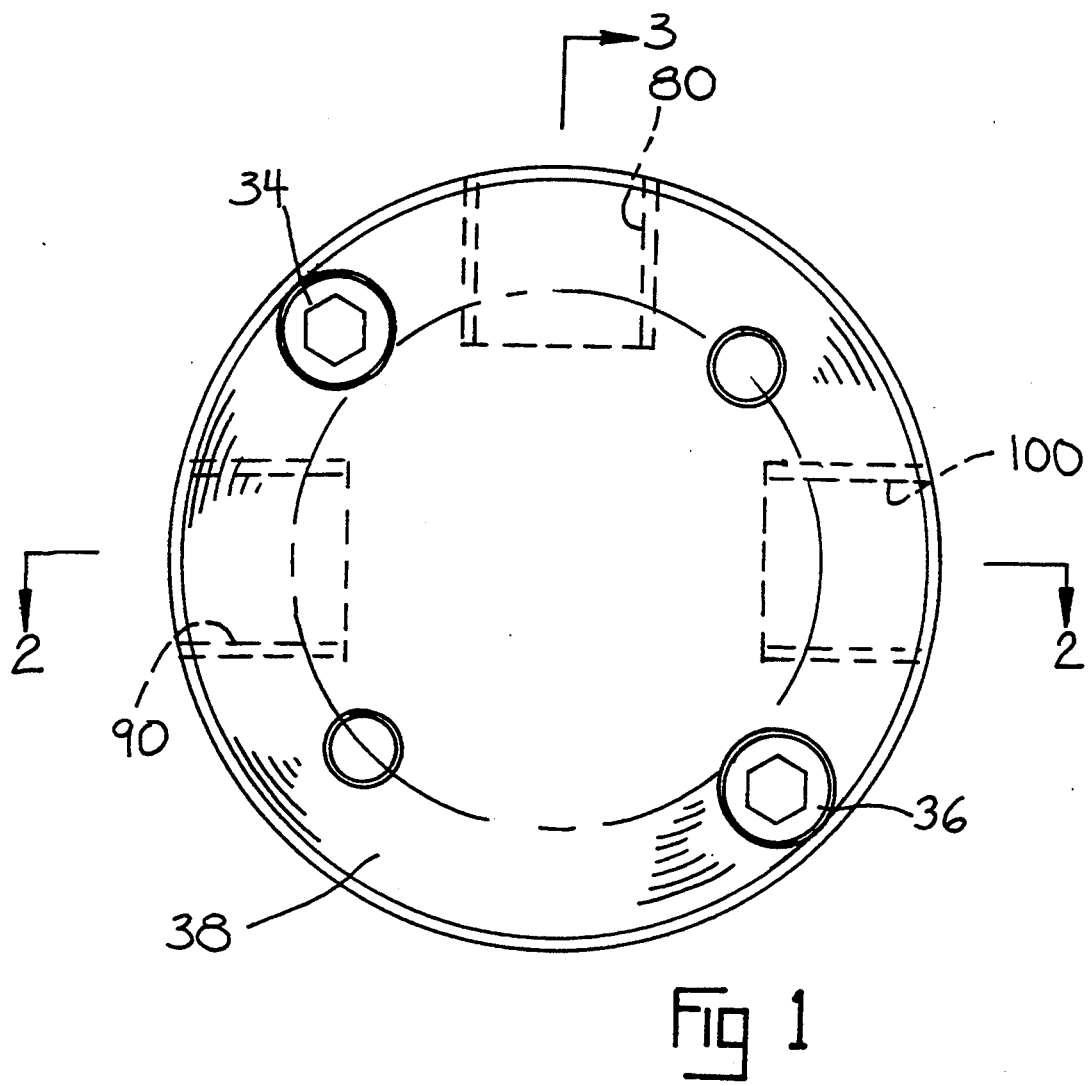
FIG. 1 is a plan view of a valve assembly according to the present invention.

Certain terminology will be used in the following description for convenience in reference only and will not be limiting. For example, the words "upwardly", "downwardly", "leftwardly", and "rightwardly" will refer to directions in the drawings to which reference is made. Words such as "inwardly" and "outwardly" will respectively refer to directions toward and away from the geometric center of the valve assembly and designated parts thereof. Said terminology will include the words specifically mentioned, derivatives thereof, and words of similar import. Further, the term fluid is herein used in its broadest generic sense and is not meant to be limiting.

DESCRIPTION OF THE PREFERRED EMBODIMENT

The preferred embodiment illustrated is not intended to be exhaustive or to limit the invention to the precise form disclosed. It has been chosen and is herein described in order to explain the principles of the invention and its practical use to enable others skilled in the art to best utilize the invention.

It will be appreciated that a three port valve has been chosen for purposes of this disclosure, but it will be understood that a two port or a multiple port valve would perform in the same fashion. More specifically, a through-passage is illustrated with an inlet passage for the introduction of a second fluid. However, this is a mere matter of choice for illustrative purposes only. One or more inlet passages may be included without departing from the invention.

As stated previously, the solenoid itself is primarily the "vehicle" with which to actuate the valve. Accordingly, solenoid 10 is depicted in a general form, without specific structure being included. An illustration of a conventional solenoid may be found in U.S. Pat. No. 4,711,269, which is incorporated herein by reference.

Generally speaking, solenoid assembly 10 includes a hollow solenoid housing 12 within which is mounted armature plate 14, armature pole piece 16 made of a metallic magnetic material, and a solenoid coil 18. Pole piece 16 is normally urged downwardly by helical compression spring 22 which is housed in cavity 24 formed in armature plate 14. Spring 22 extends between pole piece 16 and plug 23 as shown.

Solenoid assembly 10 is mounted to the upper surface of valve body 32 as by fasteners, such as machine screws 34, 36, which pass through valve body 32 and engage tapped holes (not shown) in pressure plate 40.

Valve body 32 has a cavity 50 within which is mounted diaphragm assembly 52. The poppet 42 of pole piece 16 has a tapering terminal end face 53. It will, of course, be understood that the poppet may be a separate piece which is conventionally attached to pole piece 16 and is not necessarily integral therewith. Poppet 42 is formed or machined to conform to and essentially mate with the contact surface 61 of valve seat 60.

Diaphragm assembly 52 is provided with a centrally disposed integral seat 54 which is formed so as to tightly engage poppet 42 at groove 57. The thickness of diaphragm 52 is preferably not uniform. The surface of diaphragm 52 is thicker at its outer edges 54 and thinner toward the center line 56 of poppet 42.

The outer edge of diaphragm 52 defines an enlarged bead 62 which fits tightly into annular groove 64 formed in the upper surface 66 of valve body 32. Bead portion 62 acts as a sealing ring to prevent any leakage of fluid from the valve body 32. Annular groove 64 and bead portion 62 also ensure accurate positioning of diaphragm 52 within valve body 32. Diaphragm 52 is formed of elastomeric material, such as synthetic or natural rubber or like compounds which exhibit elastic tendencies and sufficient tear strength to prevent ruptures.

Figure 3:
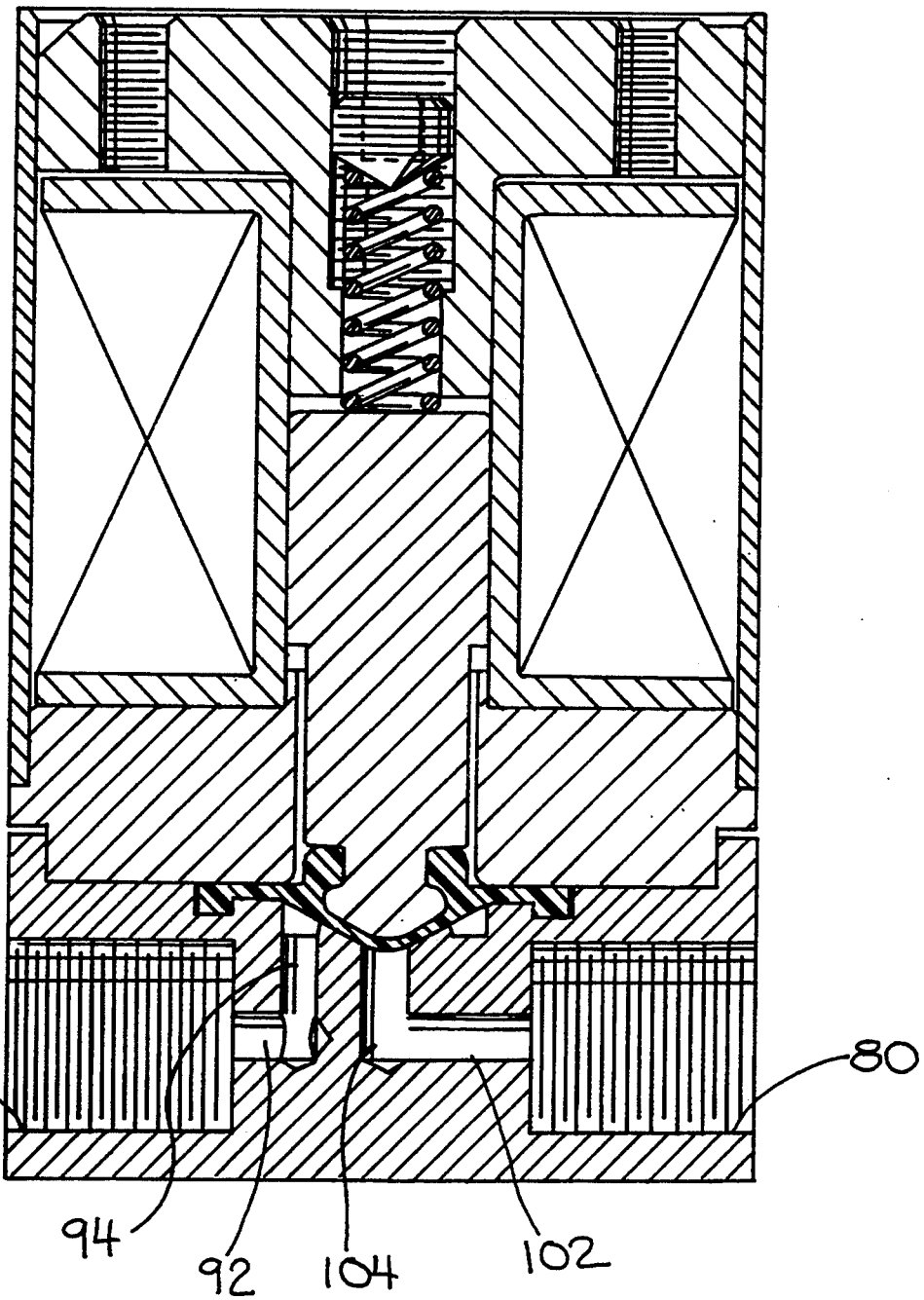
FIG. 3 is a cross-sectional view of the valve, taken along the line 3—3 of FIG. 1, and showing the solenoid assembly in the closed position.

Valve body 32 has inlet ports 80 and 100, and an outlet port 90 for the flow of fluid therethrough. Valve seat 60 is disposed between ports 80, 90 and 100 as shown. In general usage, inlet port 80 is coupled to a fluid supply (not shown) and inlet port 100 is connected to a fluid supply (not shown). Alternatively inlet port 100 may be connected to a flushing line (not shown) which allows valve 10 to be flushed when desired. Inlet port 80 communicates with outlet port 90 through bores 102, 104, 70, 94, 92 as shown in FIG. 3. Inlet port 100 communicates with outlet port 90 through bores 82, 84 and stepped groove 70 which is defined in valve body 32 between bores 84 and 94 and allows continuous fluid flow through the valve 10 in either the closed or open position. Bore 92 connects bore 94 to outlet port 90.

When solenoid 10 is deactivated the poppet 42 is in the closed position shown in FIG. 3. The passage of fluid through inlet port 80 is prevented, as poppet 42 presses diaphragm 52 against valve seat 60. In this position, fluid may pass through inlet port 100, through bores 82, 84, around annular groove 70, through vertical bore 94, through short horizontal bore 92 and out through exit port 90.

Figure 2:
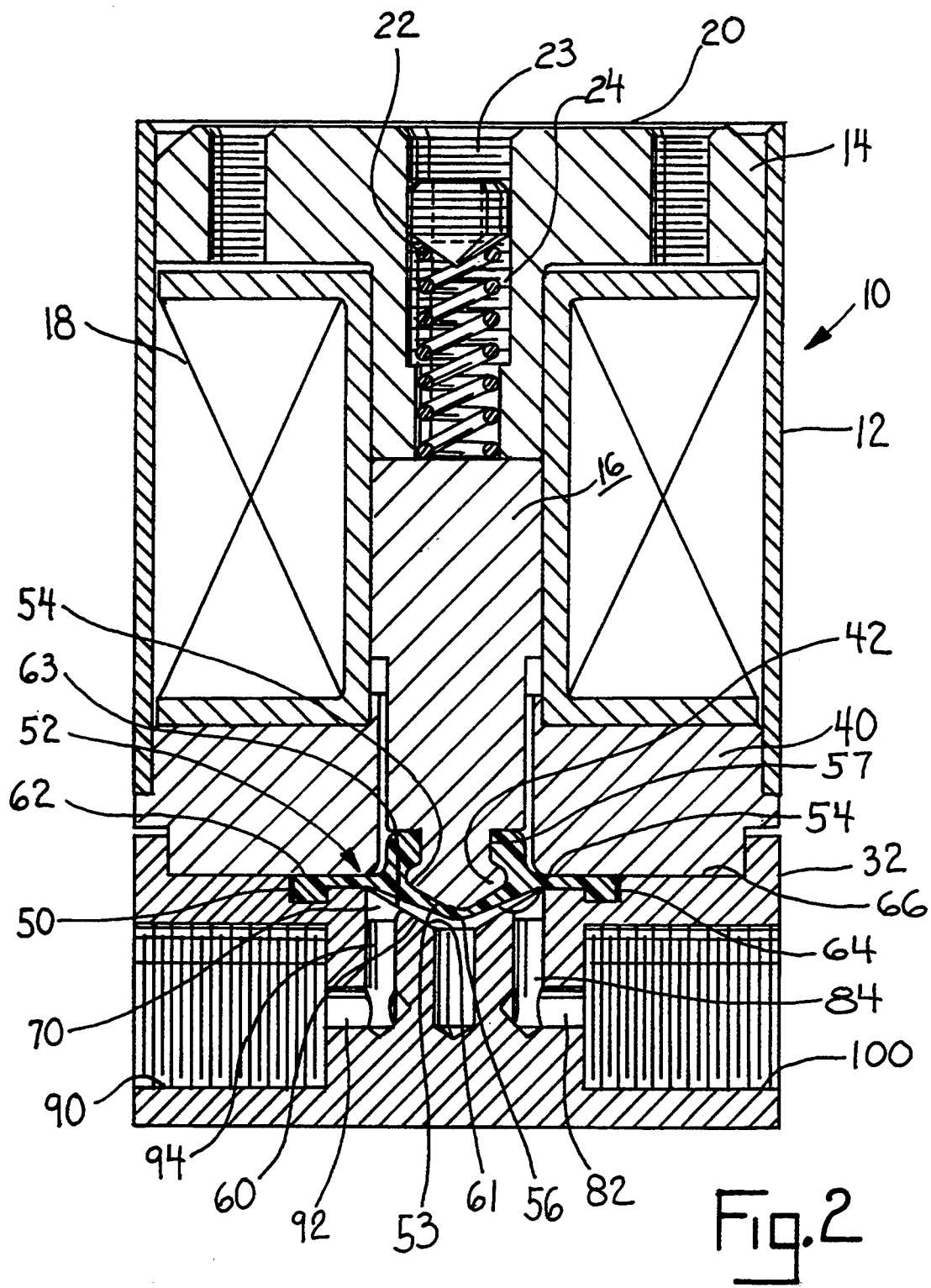
FIG. 2 is a cross-sectional view of the valve, taken along the line 2—2 of FIG. 1, and showing the solenoid assembly in the open position.

When solenoid 10 is activated, pole piece 16 is raised into the open position illustrated in FIG. 2. In this position, poppet 42 rises with pole piece 16. Diaphragm 52 is raised to permit the flow of fluid from entry port 80 through bores 102, 104 and out through outlet port 90.

Thus, the fluid entering through inlet port 80 may be co-mingled with the fluid flowing through ports 100 and 90. When it is desired to terminate the flow of this secondary fluid, solenoid 10 is deactivated and spring 24 urges pole piece 16, poppet 42 and diaphragm 52 downwardly against valve seat 60 to close passage 104.

Due to the shape of poppet 42, the elasticity of the lower face of diaphragm 52, and the complemental shape of valve seat contact face 61, diaphragm 52 first contacts face 61 at the uppermost part 63 and gradually rides down the inclined surface of the face to virtually wipe valve seat 60 clean of any contaminants or particulates.

More specifically, as poppet 42 is urged downwardly, the first surface of diaphragm 52 which meets valve seat 60 is the thicker portion 54. Since the central point 56 of diaphragm 52 is thinner, all fluids are squeezed downwardly and out. In effect, the face of diaphragm 52 "rolls" down the sides of the valve seat. This effect can also be accomplished by forming the valve seat 60 with a greater inclination than poppet face 53.

By way of illustration and not by limitation, the valve of this invention may be used in a laboratory environment. The normal flow would be as stated previously, in at port 100 around annular groove 70 and out through port 90. The secondary fluid would be connected at port 80, the solenoid would be activated to raise pole piece 16 and the secondary fluid introduced into the normal fluid flow. When the desired amount of secondary fluid has been supplied, the solenoid 10 is de-activated and the secondary fluid flow is cut off.

The fluids used with valve 10 are often highly perishable and very expensive. Because of the continuous flow through annular groove 70 and the elimination of dead space, crystalization of the solids in the primary fluid is prevented even when solenoid 12 is de-energized. Also the wiping action of the diaphragm 52 cleans the valve seat surface 56 of any solid particulates in the secondary fluid to ensure that none of the secondary fluid is wasted during usage.

From the preceding description of the preferred embodiment, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A solenoid valve comprising a valve body having a valve cavity, said valve body having a first port defining a first passageway communicating with said valve cavity, and a second port defining a second passageway communicating with said valve cavity and said first passageway, a valve seat disposed between said first and second ports and aligned with said valve cavity, electrically operated solenoid means mounted on said valve body for alternatively opening and closing said valve, said solenoid means including a solenoid coil and an armature including a poppet disposed in said cavity for movement between a retracted open position spaced from said valve seat and an extended closed position adjacent said valve seat, elastomeric diaphragm means mounted in said valve body and disposed between said poppet and said valve seat for sealing said valve cavity from said first and second passageways, said valve seat having an obliquely angled contact face, said poppet having an obliquely angled contact face substantially complemental with said valve seat contact face, and means for urging said armature means into said closed position wherein upon deactivation of said solenoid means said poppet and diaphragm means are urged into contact with said valve seat to wipe fluid from said valve seat contact face, said diaphragm means including an outer peripheral portion and a central portion of lesser thickness than said outer peripheral portion.

2. A solenoid valve comprising a valve body having a valve cavity, said valve body having a first port defining a first passageway communicating with said valve cavity, and a second port defining a second passageway communicating with said valve cavity and said first passageway, a valve seat disposed between said first and second ports and aligned with said valve cavity, electrically operated solenoid means mounted on said valve body for alternatively opening and closing said valve, said solenoid means including a solenoid coil and an armature including a poppet disposed in said cavity for movement between a retracted open position spaced from said valve seat and an extended closed position adjacent said valve seat, elastomeric diaphragm means mounted in said valve body and disposed between said poppet and said valve seat for sealing said valve cavity from said first and second passageways, said valve seat having an obliquely angled contact face, said poppet having an obliquely angled contact face, and means for urging said armature means into its said closed position compressing said elastomeric diaphragm means between said valve seat contact face and said poppet contact face, said valve seat contact face and said poppet contact face in conjunction with said elastomeric diaphragm means constituting means for urging said elastomeric diaphragm means into contact with said valve seat in a progressive manner across said valve seat contact face toward one of said first and second ports to wipe said valve seat contact face.

3. The solenoid valve of claim 2 wherein said elastomeric diaphragm means extends peripherally about said one port.

* * * * *